United States Patent [19]

Pasco

[11] Patent Number: 5,013,143
[45] Date of Patent: May 7, 1991

[54] LENS

[75] Inventor: Ian K. Pasco, Bracknell, England

[73] Assignee: Combined Optical Industries Limited, Slough, England

[21] Appl. No.: 456,631

[22] Filed: Dec. 21, 1989

Related U.S. Application Data

[63] Continuation-in-part of Ser. No. 287,647, Dec. 20, 1988, abandoned, which is a continuation of Ser. No. 130,451, Nov. 10, 1987, abandoned.

[30] Foreign Application Priority Data

Mar. 19, 1986 [GB] United Kingdom ................ 8606838

[51] Int. Cl.$^5$ .............................................. G02B 3/02
[52] U.S. Cl. .................................................... 350/432
[58] Field of Search ........................................ 350/432

[56] References Cited

U.S. PATENT DOCUMENTS 4,571,034 2/1986 Nakamura ........................... 350/432

FOREIGN PATENT DOCUMENTS 0080601 5/1983 Japan .................................. 350/435

Primary Examiner—Bruce Y. Arnold
Assistant Examiner—Rebecca D. Gass
Attorney, Agent, or Firm—Scrivener and Clarke

[57] ABSTRACT

A lens or lens system for use in reading optical data has as one component a pickup lens having finite or infinite conjugates. The pickup lens is biaspheric where the surfaces may have spherical, paraboloidal or general conic base curves and higher order correction terms up to 40th order when required. Various methods of making such a lens of plastics material are also disclosed.

3 Claims, 4 Drawing Sheets

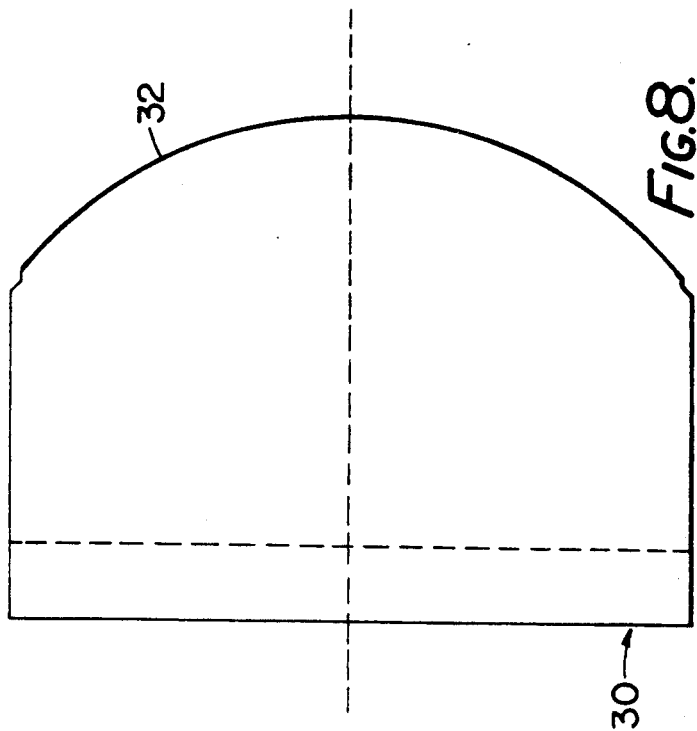
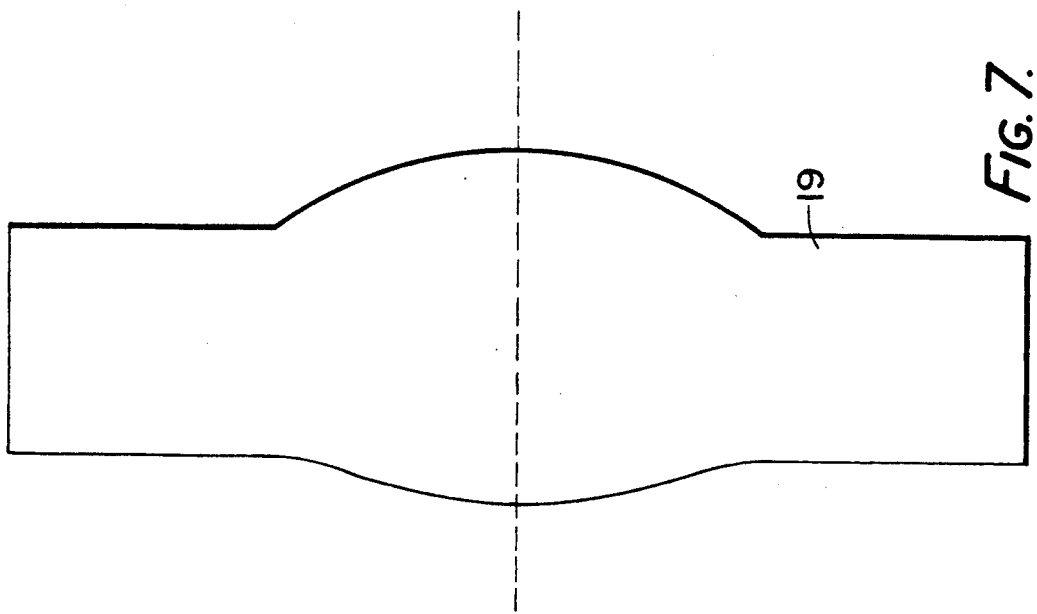

LENS

This is a continuation-in-part of application Ser. No. 07/287,647 filed Dec. 20, 1988, now abandoned, which is a continuation of application Ser. No. 07/130,451 filed Nov. 10, 1987, abandoned.

FIELD OF THE INVENTION

The present invention relates to lenses. More particularly, but not exclusively, the invention relates to small lenses adapted particularly for use with systems where information may be retrieved optically, e.g. compact disc players.

BACKGROUND OF THE INVENTION

It is known in compact disc players and similar articles for light from a laser diode to be focussed on a particular spot of the disc and the reflected light directed back through the optical system to a detector. The amount of information contained on a disc is great in comparison to its size and thus the beam of laser light must be focussed very accurately onto a particular point, so that the detector is not confused by signals reflected from other points on the disc. This has been achieved in the past by means of a somewhat complex series of lenses which are cumbersome to move so as to view the entire surface of the disc. Alternatives have included a single lens to focus the light from the laser diode directly onto this point of the disc. This however suffers from the disadvantage that the spacing of the diode and the information on the disc must be accurately known.

It is an object of the present invention to provide a lens system which overcomes the above disadvantages. It is a further object of the lens to correct for axial and radial spherical aberration using one, e.g. the first, surface, and for coma by using the other. (Field curvature is less important since very small off-axis angles are used.) It is a further object to provide a method of making a plastic lens for use in such a lens system.

One problem which may be encountered in producing such accurate lenses is lack of register between the two dies used in injection moulding the lens. So called centration errors may occur when the centres of curvature of the two faces are not exactly aligned. A decentration of 2 μm may be sufficient to destroy the diffraction limited performance of the lens. This is because an error in one face will cause large changes in the angles of incidence of light rays at an opposite face of the lens.

Similarly, errors in the thickness of the lens of as little as 5 μm may have a very similar effect for much the same reasons.

It has now been found that optical problems due to centration errors or errors in thickness may be obviated if the surfaces of the lens are so adapted that light always passes within the lens as a parallel beam. This means, of course, that each surface must be extremely accurately configured as an aspheric curve so that light arriving at the edges of the lens is diffracted to be parallel to light arriving at or near the centre of the lens. However, since the angle of incidence of light emerging from the lens is always the same, whatever the relative position of the surfaces, much larger centration errors or variations in thickness do not cause the same problems.

SUMMARY OF THE INVENTION

According to a first aspect of the present invention there is provided a lens for use in reading optical data, said lens having first and second aspheric surfaces, each said surface being configured as such a conic base curve modified by use of higher order correction terms up to 40th order that light passes within the lens between said first and said second surfaces as a substantially parallel beam.

According to a second aspect of the present invention there is provided a method of making a lens comprising the steps of machining a pair of blanks of metal to a required shape, taking a negative copy thereof by electroforming a hard metal, producing a pair of dies of hard metal from said negative copy and injecting a transparent plastics material into said pair of dies.

The preferred plastics material is polymethylmethacrylate.

It has been found that in environmental conditions where humidity is likely to exercise a deleterious effect on the lens performance, the lens may more advantageously be made from other materials, such as acrylic with low water absorption, polycarbonate, derivatives of polystyrene and certain polyolefins such as TPX and derivatives thereof.

An embodiment of the present invention will now be more particularly described by way of example and with reference to the accompanying drawings, in which:

BRIEF DESCRIPTION OF THE DRAWINGS

FIG. 7 shows a lens incorporated higher order term mathematics;

FIG. 8 shows a test plate for interferometric measurement of the lens seen in FIGS. 4 and 5.

DESCRIPTION OF THE PREFERRED EMBODIMENT

Figure 2:
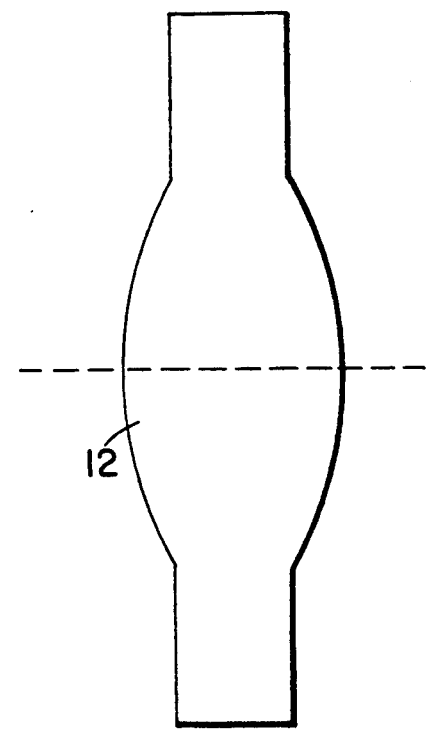
FIG. 2 shows diagrammatically a lens embodying first surface ellipsoid and second hyperboloid.
Figure 3:
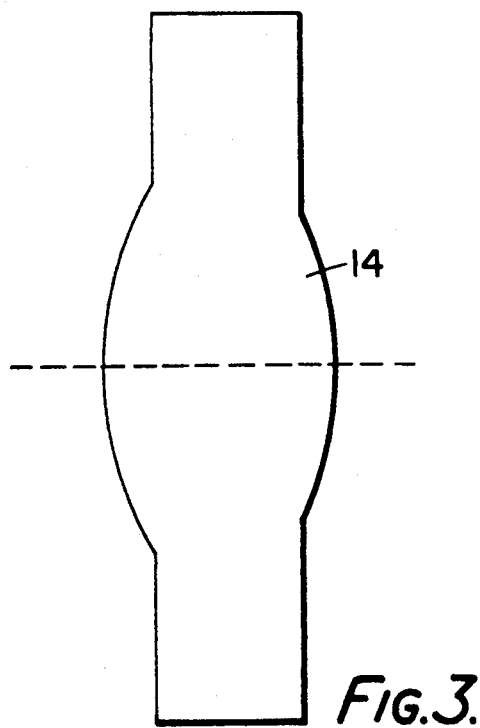
FIG. 3 shows another lens embodying a stronger ellipsoid and a weaker hyperboloid than FIG. 2.
Figure 4:
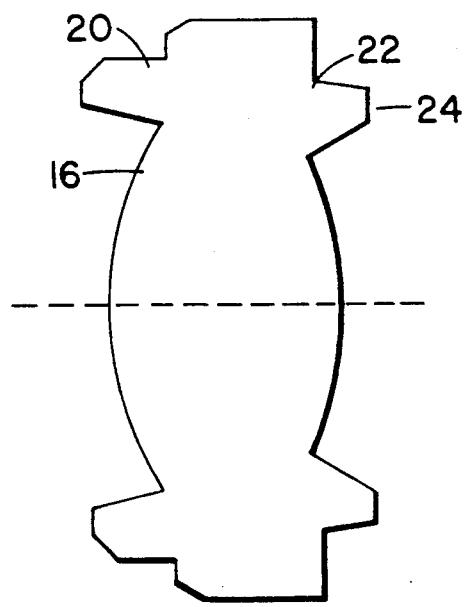
FIG. 4 shows the lens of FIG. 3, having integrally moulded shoulders for spacing purposes.
Figure 5:
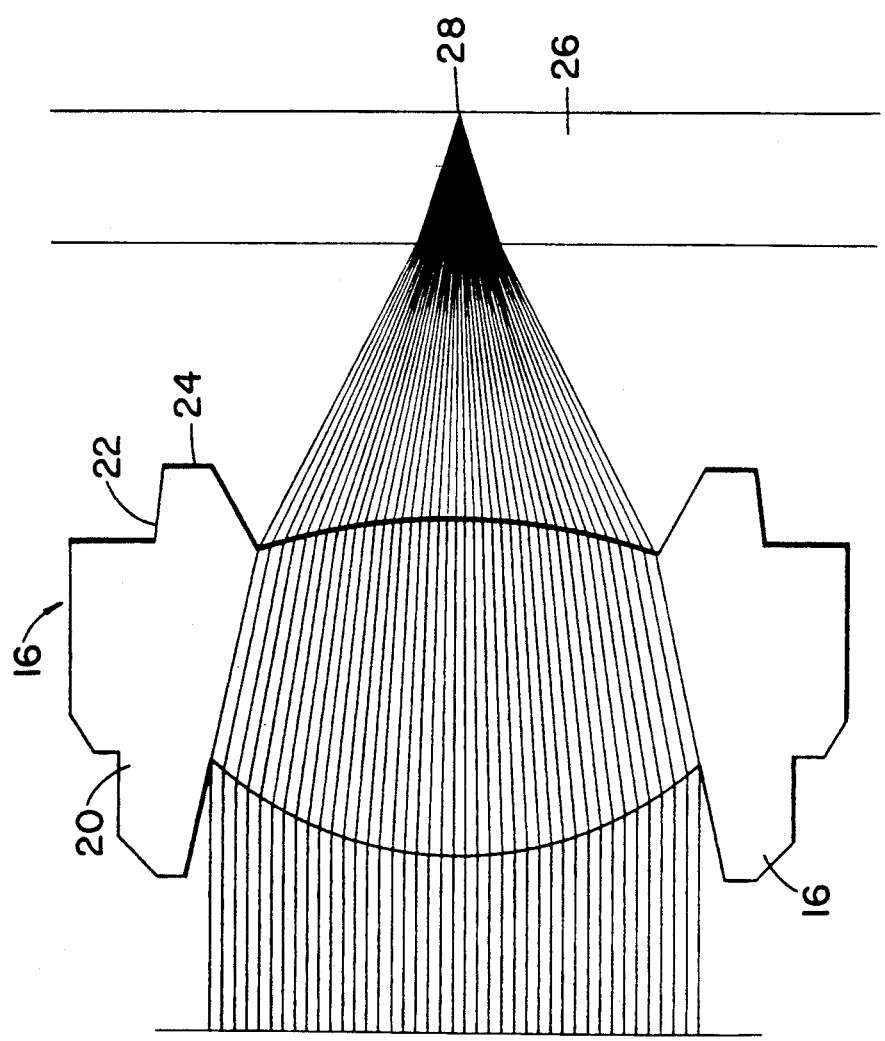
FIG. 5 is a light ray diagram of the lens of FIG. 4.

Referring now to FIGS. 1, 2, 3, 4, 6 and 7, there are shown lenses 10, 12, 14, 16, 18, and 19, respectively, of plastics material, preferably of polymethylmethacrylate but alternatively of other materials that have lower moisture absorption, which have two different aspheric surfaces and are adapted to focus parallel light from finite or infinite conjugates accurately and without distortion onto a point. The lens 16 of FIG. 4 is shown moulded integrally with abutments 20, 22 to protect the faces of the lens and which are adapted to cooperate with a lens holder. At the right-hand side, as seen in FIG. 4, registration surfaces 24 are provided whereby the lens may be maintained at a predetermined distance, e.g. 2 mm, from a disc 26 as seen in FIG. 5.

The lenses may be mould from dies made in one of a number of ways. The simplest is to machine a pair of brass blanks by means of diamond cutting which will give nominal accuracy of 0.025 microns. These may be used as dies for subsequent moulding of plastic lenses. However, since the brass is comparatively soft, the dies have a short life.

A development of the above method is to machine the brass blanks as described above, and then take a nickel electroform copy, known as a submaster from the blank. The submaster is then used to produce a nickel copy, known as a daughter, which may be used as a die for the moulding process. This has the advantage that a number of dies may be made from a single brass blank.

A further alternative is to machine hard tool steel blanks, comparatively roughly, e.g. to a tolerance of 1 micron, into a rough outline of the desired surface. The tool steel is then electroplated with nickel to a depth of approximately 3 microns. The nickel layer can then be machined by diamond cutting to the exact shape required with an accuracy as above. This can be used directly as a production die.

A further alternative is to machine a hard tool steel surround in which may be mounted an insert manufactured from certain ceramics of which examples are silicon or sapphire. These may be diamond machined directly and used as production dies.

It is preferred for production that a mould be constructed in which a plurality of lenses are produced.

Lenses 16 according to FIG. 4 are intended to focus collimated light to a point 28 within the material of the disc 26. Accordingly, it is not possible to test such lenses for quality control in the absence of the disc material.

The lens of FIG. 3 is an interim infinite conjugate design intended for easy laboratory interferometry since it focuses to a real point in space. Testing is conducted by passing parallel light through the lens and reflecting it from a common sphere reflector placed such that its centre of curvature coincides with the focal point of the lens. The returned light then forms fringes at an interferometer beam splitter and shows the double-pass performance of the lens.

Figure 6:
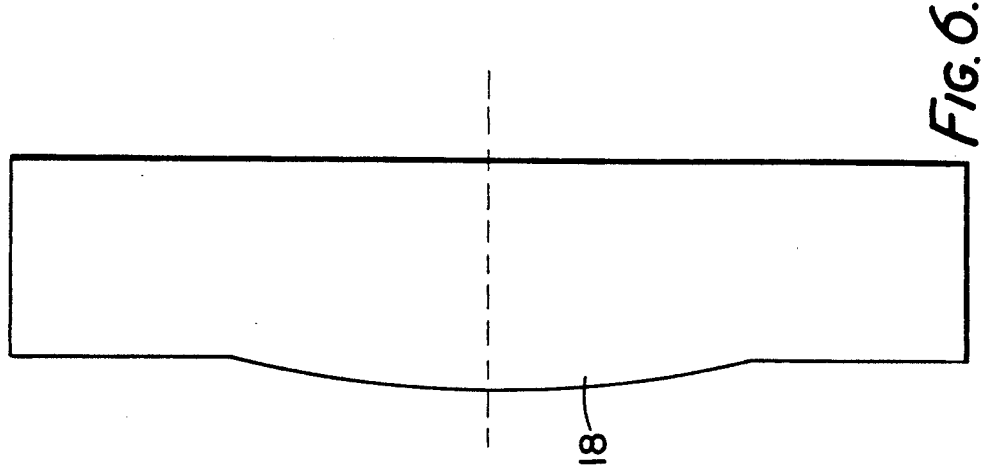
FIG. 6 shows diagrammatically a lens embodying a finite conjugate principle.

The lens 18 of FIG. 6 is a finite conjugate lens, for which testing resembles that for FIG. 3 excpet that the input light of the lens must have a cone angle equal to that in actual use.

The lens 16 in FIGS. 4 and 5 cannot be directly measured in the manner of the lens shown in FIG. 3, since the real focus 28 of the light is contained within the body of the disc at a rear surface thereof.

Accordingly it is necessary to simulate the disc plus a volume space in a test plate 30 similar material and to provide a reflecting sphere surface 32 as the rear surface of that volume space as shown in FIG. 8. This test plate is shown in FIG. 8. It is manufactured to great accuracy in BK7 glass. Production lenses may be tested directly by this method, be they of finite or infinite conjugate form.

Figure 9:
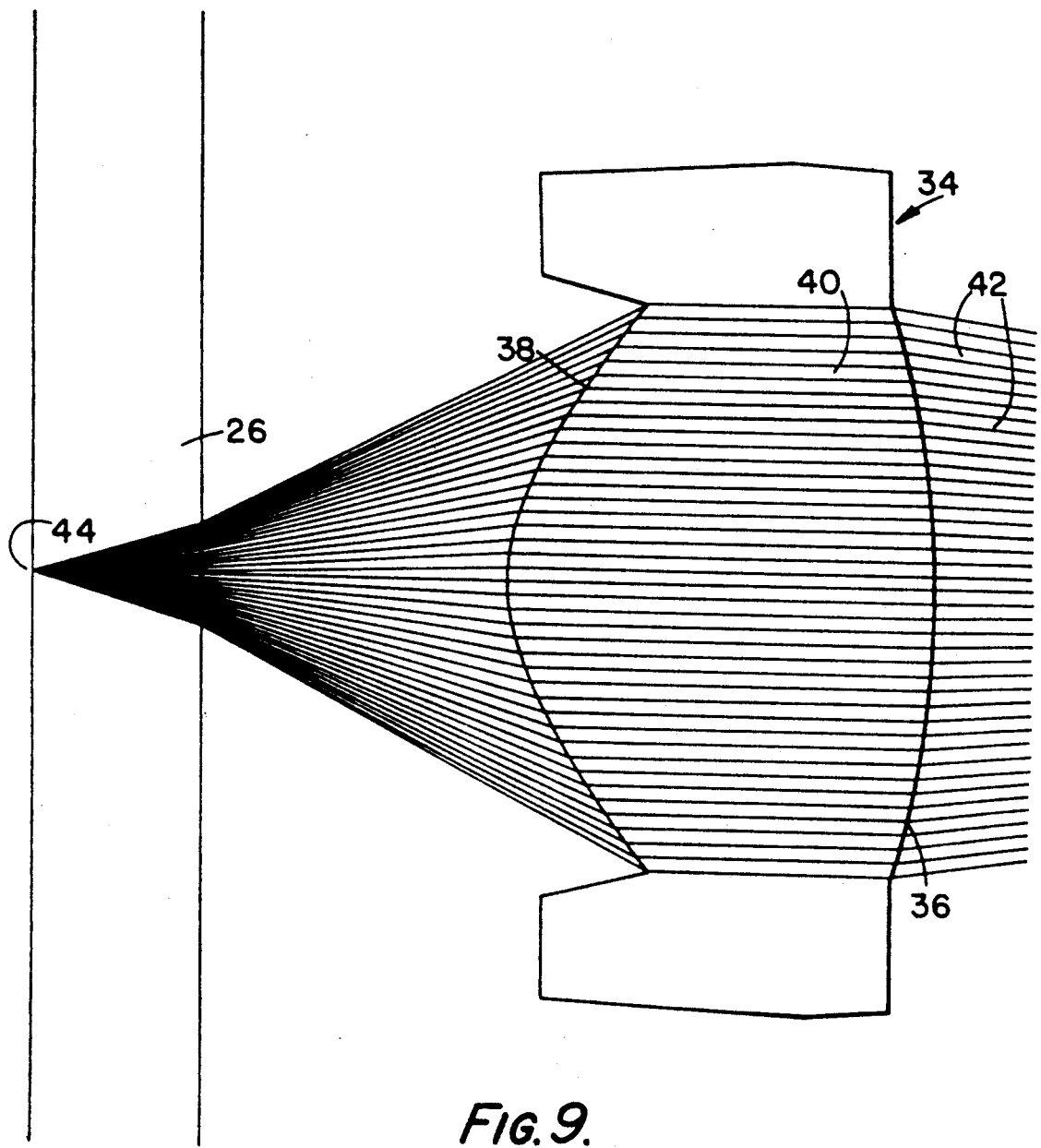
FIG. 9 is a light ray diagram of a lens having paraboloidal based curved surfaces and adapted to have a parallel light, beam within the lens.

FIG. 9 illustrates a lens 34 having first and second aspheric surfaces 36, 38, each of which is so configured as a conic base curve modified by use of higher order correction terms up to the 40th order that light passes within the lens between its first and second surfaces 36, 38 as a substantially parallel beam as indicated in FIG. 9 by the rays 40. More particularly the surfaces 36, 38 are configured as paraboloidal based curves so that light diverging towards the lens from a point source as indicated by the diverging rays 42 shown in FIG. 9, and converging from the lens to the focal point 44, passes within the lens over its entire area between the first and second surfaces 36, 38 as a substantially parallel beam. A lens having the foregoing characteristics can be referred to as a finite conjugate lens.

The preferred light source is a laser diode having a peak wavelength of 780 nm. For light of this wavelength, the refractive index of polymethylmethacrylate is taken to be 1.4848.

In infinite conjugate lens systems, the light leaving the collimator lens and reaching the pickup lens comprises parallel rays and accordingly separation of the two lenses is comparatively unimportant. The pickup lens is adapted to be maintained at a predetermined distance from the disc on which is stored the data and, being made of plastics material, is sufficiently light to be moved easily.

In order for the lens to focus accurately on data stored in the disc, it is important that the focal point of the rays passing through the lens has a small spot diameter and that the wavelength aberration is sufficiently low for the spot to be located at a predetermined point. In order to achieve this, the geometry of the surface is calculated as follows:

The formula for a conic section $y^2 - 2rx + px^2 = 0$ The equation for the generalised aspheric is:

$$y = \frac{x^2/r}{1 + ((1 - p \cdot x^2/r^2))^{\frac{1}{2}}} + A_4 x^4 + A_6 x^6 + A_8 x^8 + \ldots A_{30} x^{30}$$

where
y = height of curve
x = radial distance from axis
p = eccentricity
r = radius at apex of aspheric surface
and $A_4$, $A_6$, $A_8$, $A_{10}$ etc., are correction coefficients.
The first term may be used in three forms:

(a) p = 1. This ascribes a base sphere curve to the surface and the higher order terms determine the departures from the sphere that make it aspheric. The equation becomes:

$$y = \frac{x^2/r}{1 + ((1 - x^2/r^2))^{\frac{1}{2}}} + A_4 x^4 + A_6 x^6 + A_8 x^8 + \ldots A_{30} x^{30}$$

(b) p = 0. This ascribes a base paraboloid curve to the surface, and the higher order terms determine the departures from the paraboloid that make it aspheric.
The equation becomes:

$$y = \frac{x^2}{r} + A_4 x^4 + A_6 x^6\, A_8 x^8 + \ldots + A_{30} x^{30}$$

sometimes written:

$$y = A_2 x^2 + A_4 x^4 + \ldots A_{30} x^{30}$$

(c) P = n. n having any value.

This is the most general form. When used in the lenses seen in FIGS. 1-4, the value of P is allowed to float. This has a disadvantage in computing time, since the variation that is permitted in P alters the base curve. Cases (a) and (b) with fixed P are most economical of computing time.

In the following Table of lens parameters, the back vertex focal length given for the embodiment of FIG. 4 is calculated on the basis that the disc is not present. The spot diameter given in the table is calculated geometrically and takes no account of diffraction effects.

Other figures given should be self-explanatory to those skilled in the art.

The figures given in respect of the lens of FIG. 4 are based on the assumption that the data is situated at a distance of 1.3 mm behind the front surface of the disc, the refractive index of the material of which is 1.55.

Clearly, if the disc material is of different refractive index or thickness, the exact parameters of the lens may need to be changed slightly in some respects.

As examples, coefficients for various lenses are given in the Table below.

TABLE

Figure 1:
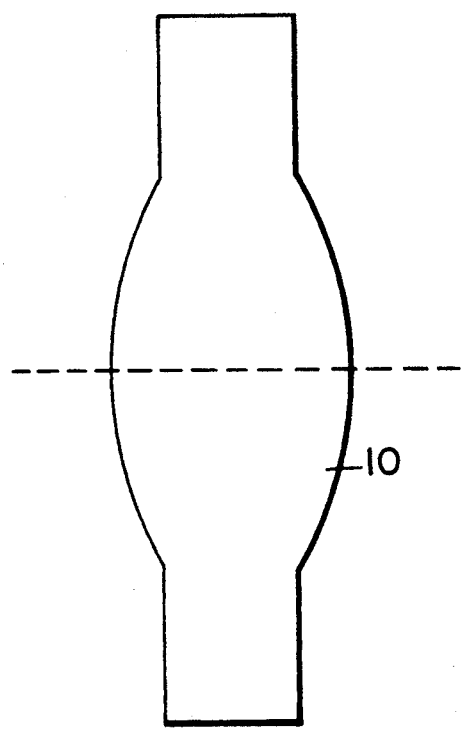
FIG. 1 shows diagrammatically a lens art having aspheric surfaces.

| LENS PARAMETERS | |
|---|---|
| FIG. 1 | |
| VERTEX RADIUS R1 (mm) | 4.42897 |
| VERTEX RADIUS R2 (mm) | 4.2897 |
| ECCENTRICITY P1 | −1.3961 |
| ECCENTRICITY P2 | −1.3961 |
| FRONT SURFACE DIAMETER mm | 5 |
| REAR SURFACE DIAMETER mm | 5 |
| CENTER THICKNESS mm | 3 |
| EDGE THICKNESS mm | 1.77242 |
| FOCAL LENGTH FVFL mm | $1 \times 10^9$ |
| FOCAL LENGTH BVFL mm | 3.99996 |
| CAPHEIGHT 1 mm | .61379 |
| CAPHEIGHT 2 MM | .61379 |
| FRONT SURFACE NUMERICAL APERTURE | $2.5 \times 10^{-9}$ |
| REAR SURFACE NUMERICAL APERTURE | .44407 |
| AXIAL WORKING DISTANCE mm | — |
| SURROUND DIAMETER mm | 9 |
| WAVEFRONT ABERRATION wavelengths | $5.5364 \times 10^{-3}$ |
| AVERAGE SPOT DIAMETER microns | — |
| MAXIMUM SPOT DIAMETER microns | — |
| INDEX N AT 780 NM | — |
| FRONT SURFACE COEFF A4 | — |
| FRONT SURFACE COEFF A6 | — |
| FRONT SURFACE COEFF A8 | — |
| FRONT SURFACE COEFF A10 | — |
| BACK SURFACE COEFF B4 | — |
| BACK FURFACE COEFF B6 | — |
| BACK SURFACE COEFF B8 | — |
| BACK SURFACE COEFF B10 | — |
| FIG. 2 | |
| VERTEX RADIUS R1 (mm) | 4.5 |
| VERTEX RADIUS R2 (mm) | 4.28147 |
| ECCENTRICITY P1 | .43618 |
| ECCENTRICITY P2 | −5.91061 |
| FRONT SURFACE DIAMETER mm | 5 |
| REAR SURFACE DIAMETER mm | 5 |
| CENTER THICKNESS mm | 3 |
| EDGE THICKNESS mm | 1.49612 |
| FOCAL LENGTH FVFL mm | $1 \times 10^9$ |
| FOCAL LENGTH BVFL mm | 3.98505 |
| CAPHEIGHT 1 mm | .72016 |
| CAPHEIGHT 2 MM | .78371 |
| FRONT SURFACE NUMERICAL APERTURE | $2.5 \times 10^{-18}$ |
| REAR SURFACE NUMERICAL APERTURE | .43043 |
| AXIAL WORKING DISTANCE mm | — |
| SURROUND DIAMETER mm | 9 |
| WAVEFRONT ABERRATION wavelengths | 0 |
| AVERAGE SPOT DIAMETER microns | $8.24482 \times 10^{-3}$ |
| MAXIMUM SPOT DIAMETER microns | .41457 |
| INDEX N AT 780 NM | 1.4848 |
| FRONT SURFACE COEFF A4 | $1.35043 \times 10^{-5}$ |
| FRONT SURFACE COEFF A6 | $1.21182 \times 10^{-7}$ |
| FRONT SURFACE COEFF A8 | $7.61490 \times 10^{-8}$ |
| FRONT SURFACE COEFF A10 | $-4.72817 \times 10^{-9}$ |
| BACK SURFACE COEFF B4 | .01096 |
| BACK SURFACE COEFF B6 | $-1.93513 \times 10^{-3}$ |
| BACK SURFACE COEFF B8 | $3.87609 \times 10^{-4}$ |
| BACK SURFACE COEFF B10 | $-3.11299 \times 10^{-5}$ |
| FIG. 3 | |
| VERTEX RADIUS R1 (mm) | 4 |
| VERTEX RADIUS R2 (mm) | 3.62377 |
| ECCENTRICITY P1 | .43906 |
| ECCENTRICITY P2 | −4.73852 |
| FRONT SURFACE DIAMETER mm | 4.67¹ |
| REAR SURFACE DIAMETER mm | 3.91441 |
| CENTER THICKNESS mm | 3 |
| EDGE THICKNESS mm | 1.90417 |
| FOCAL LENGTH FVFL mm | $1 \times 10^9$ |
| FOCAL LENGTH BVFL mm | 3.39803 |
| CAPHEIGHT 1 mm | .70939 |

TABLE-continued

| LENS PARAMETERS | |
|---|---|
| CAPHEIGHT 2 MM | .50071 |
| FRONT SURFACE NUMERICAL APERTURE | $2.335 \times 10^{-9}$ |
| REAR SURFACE NUMERICAL APERTURE | .45938 |
| AXIAL WORKING DISTANCE mm | — |
| SURROUND DIAMETER mm | 9 |
| WAVEFRONT ABERRATION wavelengths | $6.48003 \times 10^{-3}$ |
| AVERAGE SPOT DIAMETER microns | $6.96782 \times 10^{-3}$ |
| MAXIMUM SPOT DIAMETER microns | .02384 |
| INDEX N AT 780 NM | 1.4848 |
| FRONT SURFACE COEFF A4 | $2.02566 \times 10^{-5}$ |
| FRONT SURFACE COEFF A6 | $-1.56282 \times 10^{-6}$ |
| FRONT SURFACE COEFF A8 | $-7.21319 \times 10^{-6}$ |
| FRONT SURFACE COEFF A10 | $-3.66427 \times 10^{-9}$ |
| BACK SURFACE COEFF B4 | $-2.91488 \times 10^{-3}$ |
| BACK SURFACE COEFF B6 | $3.37156 \times 10^{-4}$ |
| BACK SURFACE COEFF B8 | $-3.03817 \times 10^{-5}$ |
| BACK SURFACE COEFF B10 | $1.44043 \times 10^{-6}$ |

FIG. 4

| | |
|---|---|
| VERTEX RADIUS R1 (mm) | 3.5 |
| VERTEX RADIUS R2 (mm) | 4.17071 |
| ECCENTRICITY P1 | .43782 |
| ECCENTRICITY P2 | −6.02993 |
| FRONT SURFACE DIAMETER mm | 4.67 |
| REAR SURFACE DIAMETER mm | 3.81635 |
| CENTER THICKNESS mm | 3 |
| EDGE THICKNESS mm | 1.85678 |
| FOCAL LENGTH FVFL mm | $1 \times 10^9$ |
| FOCAL LENGTH BVFL mm | 3.32996 |
| CAPHEIGHT 1 mm | .82167 |
| CAPHEIGHT 2 MM | .32153 |
| FRONT SURFACE NUMERICAL APERTURE | $2.335 \times 10^{-9}$ |
| REAR SURFACE NUMERICAL APERTURE | .44648 |
| AXIAL WORKING DISTANCE mm | 2.46642 |
| SURROUND DIAMETER mm | — |
| WAVEFRONT ABERRATION wavelengths | $6.03223 \times 10^{-3}$ |
| AVERAGE SPOT DIAMETER microns | $5.55085 \times 10^{-3}$ |
| MAXIMUM SPOT DIAMETER microns | .026111 |
| INDEX N AT 780 NM | 1.4848 |
| FRONT SURFACE COEFF A4 | $3.39588 \times 10^{-5}$ |
| FRONT SURFACE COEFF A6 | $-1.26846 \times 10^{-6}$ |
| FRONT SURFACE COEFF A8 | $-9.70149 \times 10^{-6}$ |
| FRONT SURFACE COEFF A10 | $-1.72746 \times 10^{-6}$ |
| BACK SURFACE COEFF B4 | $-2.94112 \times 10^{-3}$ |
| BACK SURFACE COEFF B6 | $3.35664 \times 10^{-4}$ |
| BACK SURFACE COEFF B8 | $-2.96989 \times 10^{-5}$ |
| BACK SURFACE COEFF B10 | $1.39549 \times 10^{-6}$ |

FIG. 7

| | |
|---|---|
| VERTEX RADIUS R1 (mm) | 3.5 |
| VERTEX RADIUS R2 (mm) | 1.34174694 |
| ECCENTRICITY P1 | −1.7089737 |
| ECCENTRICITY P2 | −1.95289956 |
| FRONT SURFACE DIAMETER mm | 3.2 |
| REAR SURFACE DIAMETER mm | 2.77357138 |
| CENTER THICKNESS mm | 3 |
| EDGE THICKNESS mm | 2.13276926 |
| FOCAL LENGTH FVFL mm | 21.11 |
| FOCAL LENGTH BVFL mm | 2.11403851,+/−,9.87201929E − 09 |
| CAPHEIGHT 1 mm | .36771524 |
| CAPHEIGHT 2 MM | .499515317 |
| FRONT SURFACE NUMERICAL APERTURE | .0742899633 |
| REAR SURFACE NUMERICAL APERTURE | .468716913 |
| AXIAL WORKING DISTANCE mm | — |
| SURROUND DIAMETER mm | 9 |
| WAVEFRONT ABERRATION wavelengths | .0114945761 |
| AVERAGE SPOT DIAMETER microns | 7.74456871E − 03 |
| MAXIMUM SPOT DIAMETER microns | .0657965873 |
| INDEX N AT 780 NM | 1.4848 |
| FRONT SURFACE COEFF A4 | 5.26050195E − 03 |
| FRONT SURFACE COEFF A6 | −3.27078542E − 04 |
| FRONT SURFACE COEFF A8 | 2.29074906E − 05 |
| FRONT SURFACE COEFF A10 | −9.47253292E − 07 |
| BACK SURFACE COEFF B4 | −8.69752098E − 03 |
| BACK SURFACE COEFF B6 | 2.43576402E − 03 |
| BACK SURFACE COEFF B8 | −5.09678603E − 04 |
| BACK SURFACE COEFF B10 | 5.30418995E − 05 |

For a lens having has a first surface which is a modified paraboloid, and a second surface which is a sphere, the coefficients are:

| | | |
|---|---|---|
| R1 | = | 4.00004423 |
| P1 | = | 0.0 |
| A4 | = | 4.97077925E − 03 |
| A6 | = | −6.44283909E − 04 |
| A8 | = | 4.63956166E − 05 |
| A10 | = | −1.98201830E − 06 |
| A12 | = | 1.38707138E − 08 |
| A14 | = | 1.01685400E − 08 |
| A16 | = | 1.26126874E − 09 |
| A10 | = | −1.80280027E − 11 |
| A20 | = | 7.51358007E − 11 |
| A22 | = | 1.97870162E − 11 |
| A24 | = | 2.89682560E − 12 |
| A26 | = | −2.00331516E − 13 |
| $R_2$ | = | 3.6237 |
| $P_2$ | = | 1.0 |
| CT | = | 3.0 |
| OD | = | 4.40 mm |
| n | = | 1.4848 |
| BVFL | = | 3.39803 |

The lens shown in FIG. 9 has the following parameters, where the suffix 1 indicates the surface 36 of the lens 34 facing the light source and the suffix 2 indicates the surface 38 adjacent the data:

R1 = 6.519161192
R2 = 1.417649032
Focal lengths: 13.447 and 2.924.

The correction coefficients are:

R1:

| | | |
|---|---|---|
| A (0) | = | 0.9714451465E − 16 |
| A (2) | = | 0.7669698375E − 01 |
| A (4) | = | −0.5363691345E − 03 |
| A (6) | = | 0.7449719096E − 05 |
| A (8) | = | −0.1016339018E − 06 |
| A(10) | = | −0.1966773871E − 06 |
| A(12) | = | 0.9415059739E − 06 |
| A(14) | = | −0.3062418961E − 05 |
| A(16) | = | 0.7117879934E − 05 |
| A(18) | = | −0.1214173990E − 04 |
| A(20) | = | 0.1548568761E − 04 |
| A(22) | = | −0.1494984713E − 04 |

-continued

| | | |
|---|---|---|
| A(24) | = | 0.109996720E − 04 |
| A(26) | = | −0.6179572934E − 05 |
| A(28) | = | 0.2640773469E − 05 |
| A(30) | = | −0.8496807584E − 06 |
| A(32) | = | 0.2019350121E − 06 |
| A(34) | = | −0.3430083471E − 07 |
| A(36) | = | 0.3931383922E − 08 |
| A(38) | = | −0.2719506445E − 09 |
| A(40) | = | 0.8563070683E − 11 |

R2:

| | | |
|---|---|---|
| A (0) | = | 0.3552713679E − 14 |
| A (2) | = | 0.3526966045E + 00 |
| A (4) | = | −0.5125784921E − 01 |
| A (6) | = | 0.1466651437E − 01 |
| A (8) | = | −0.5212967886E − 02 |
| A(10) | = | 0.2068848280E − 02 |
| A(12) | = | −0.8779736656E − 03 |
| A(14) | = | 0.3892564622E − 03 |
| A(16) | = | −0.1770693412E − 03 |
| A(18) | = | 0.8084716897E − 04 |
| A(20) | = | −0.3591683212E − 04 |
| A(22) | = | 0.1493001801E − 04 |
| A(24) | = | −0.5571960943E − 05 |
| A(26) | = | 0.1796544263E − 05 |
| A(28) | = | −0.4835163117E − 06 |
| A(30) | = | 0.1051493589E − 06 |
| A(32) | = | −0.1784146723E − 07 |
| A(34) | = | 0.2259924123E − 08 |
| A(36) | = | −0.2001102091E − 09 |
| A(38) | = | 0.1101287862E − 10 |
| A(40) | = | −0.2828159074E − 12 |

I claim:

1. A finite conjugate lens for use in reading optical data, said lens having first and second aspheric surfaces, each said surface being configured as such a conic base curve modified by use of higher order correction terms up to 40th order such that the light passes within the lens between said first and said second surfaces as a substantially parallel beam.

2. A lens according to claim 1, wherein the first and second surfaces are each based on a paraboloidal curve.

3. A lens according to claim 1 wherein said first and second aspheric surfaces are configured such that the light diverging from a point source towards the lens and converging from the lens toward the focal point thereof passes within said lens between said first and second surfaces as a substantially parallel beam.

* * * * *